(12) United States Patent
McGrady

(10) Patent No.: US 7,618,611 B2
(45) Date of Patent: Nov. 17, 2009

(54) HYDROGEN STORAGE MATERIALS

(75) Inventor: Gerard Sean McGrady, Lincoln (CA)

(73) Assignee: University of New Brunswick, Nova Scotia (CA)

( * ) Notice: Subject to any disclaimer, the term of this patent is extended or adjusted under 35 U.S.C. 154(b) by 717 days.

(21) Appl. No.: 11/311,846

(22) Filed: Dec. 19, 2005

(65) Prior Publication Data

US 2006/0159613 A1 Jul. 20, 2006

Related U.S. Application Data

(60) Provisional application No. 60/636,549, filed on Dec. 17, 2004.

(30) Foreign Application Priority Data

Dec. 7, 2005 (CA) .................................... 2529433

(51) Int. Cl.
*C01B 6/24* (2006.01)
(52) U.S. Cl. .................. 423/644; 423/646; 423/647
(58) Field of Classification Search .................. 423/644
See application file for complete search history.

(56) References Cited

FOREIGN PATENT DOCUMENTS

SU 364562 A * 11/1971

OTHER PUBLICATIONS

T.N. Dymova et al, "Reaction of Alkali Metals and Hydrogen With Gallium," N.S. Kurnakiv Institute of General and Inorganic Chemistry, Academy of Sciences of the USSR, Moscow, translated from Izvestiya Akademii Nauk SSSR, Seriya Khimicheskaya, No. 6, p. 1193-1198, Jun. 1981.

M.E. Arroyo Y De Dompablo, et al, "First principles investigations of complex hydrides AMH4 and A3MH6 (A=Li, Na, K, M= B, Al, Ga) as hydrogen storage systems," Journal of Alloys and Compounds, Elsevier Sequoia, Lausanne, Switzerland, vol. 364, No. 1-2, Feb. 11, 2004.

W. Grochala, et al, "Thermal Decomposition of the Non-Interstitial Hydrides for the Storage and Production of Hydrogen," Chemical Revision, vol. 104, Feb. 18, 2004.

C.H. Christensen, et al, "Metal ammine complexes for hydrogen storage," Journal of Materials Chemistry, 2005, vol. 15, Sep. 7, 2005.

Technical University of Denmark, "Danish Researchers Reveal New Hydrogen Storage Technology," Sep. 8, 2005.

Green Car Congress, "Handheld Hydrogen: Metal Ammine Complexes in Tablet Form," BioAge Group, LLC, Sep. 11, 2005.

European Search Report, EP 05 11 2380, Apr. 19, 2006, European Patent Office, Munich, Germany.

R.Z. Sorensen, et al, "Integrated Micro System for Controlled Delivery of Hydrogen from Metal Ammines," American Institute of Chemical Engineers, 2006 Spring National Meeting.

* cited by examiner

*Primary Examiner*—Melvin C Mayes
*Assistant Examiner*—Kenneth Vaden
(74) *Attorney, Agent, or Firm*—Krieg DeVault LLP

(57) ABSTRACT

Hydrogen storage materials which are liquid metal alloys in their discharged state, thereby facilitating their recharging by reaction with hydrogen gas.

4 Claims, No Drawings

HYDROGEN STORAGE MATERIALS

CROSS REFERENCE TO RELATED APPLICATION

This application claims priority to and the benefit of U.S. provisional application Ser. No. 60/636,549 filed on Dec. 17, 2004. This application also claims priority to and the benefit of Canadian application Serial No. 2529433 filed on Dec. 7, 2005.

FIELD OF THE INVENTION

This invention relates generally to hydrogen storage materials and more specifically relates to hydrogen storage materials which are liquid metal alloys in their discharged state.

BACKGROUND OF THE INVENTION

Hydrogen storage materials or media (HSMs) are a class of chemical compounds containing hydrogen in a chemically or physically bound form. There is a particular current interest in HSMs for hydrogen storage applications and in particular, for hydrogen-powered vehicles for use in a 'hydrogen economy'. This use requires an on-board source of hydrogen fuel. Hydrogen storage for transportation must operate within minimum volume and weight specifications, supply enough hydrogen for sufficient distance, charge/recharge near room temperature, and provide hydrogen at rates fast enough for fuel cell locomotion of automotive vehicles. Therefore, in order to create a useful on-board source of hydrogen fuel, an efficient method of storing the hydrogen is required.

Despite optimism over the last three decades, a hydrogen economy remains a utopian vision. The US Department of Energy (DOE) Basic Science group recently summarized the fundamental scientific challenges that must be met before a hydrogen economy becomes viable. In *Basic Research Needs For The Hydrogen Ecomony*, US DOE Report, May 2003, the following design criteria were identified for a viable HSM:

(i) High hydrogen storage capacity (min 6.5 wt % H).
(ii) Low $H_2$ generation temperature ($T_{dec}$ ideally around 60-120° C.).
(iii) Favorable kinetics for $H_2$ adsorption/desorption.
(iv) Low cost.
(v) Low toxicity and low hazards.

Virtually all HSMs used in prior art technologies have been known for several decades, and none of them meet all five of the criteria listed above. For example, a number of alloys such as FeTi, $Mg_2Ni$ and $LaNi_5$ satisfy criteria (2)-(5) but fail on criterion 1, containing only a few wt % hydrogen when fully loaded. $Li_3BeH_7$ reversibly stores 8.7% hydrogen by weight, but is highly toxic, thereby failing on criterion (5). Materials such as $LiBH_4$ and $NaBH_4$ react rapidly with water (hydrolysis) to release large amounts of hydrogen, but this process is chemically irreversible. Many other materials satisfy criteria (1), (2), (4) and (5), but not criterion (3).

SUMMARY OF INVENTION

In one aspect, this invention provides a reversible hydrogen storage material including on a liquid metal alloy that is a solid in its charged state and a liquid in its discharged state.

In another aspect, the invention provides a method of making a hydrogen storage material comprising a metal alloy that in its discharged state is in a liquid phase, including the step of hydrogenating a ternary alloy.

DETAILED DESCRIPTION OF THE INVENTION

The present invention relates to a hydrogen storage material that is a solid in its charged state, but a liquid when discharged. The liquid nature of the discharged material overcomes some of the problems described above, and facilitates the uptake of hydrogen to return the material to its fully hydrogenated state.

In one embodiment of this invention, the discharged state is an alloy of gallium and an alkali metal. Gallium has a melting point just above room temperature (29.8° C.), and such alloys are liquids under normal conditions. Gallium metal can be mixed with an alkali metal to produce a liquid material of the form $M_3Ga$.

In another embodiment of this invention, the new liquid alloy $Li_3Ga$ can be used as a HSM. This can be hydrogenated to form the solid compound $Li_3GaH_6$, which has a hydrogen content of 6.3 wt % hydrogen, very close to criterion 1 stated above. Another suitable HSM according to the invention is $Na_3GaH_6$, which will release $H_2$ around 100° C.

The liquid nature of the depleted $Li_3Ga$ renders it mobile and significantly enhances its rehydrogenation to $Li_3GaH_6$ and the process circumvents the poor kinetic uptake of $H_2$ associated with many HSMs which are solid in the discharged state (q.v.).

In other embodiments of the invention, the liquid alloy may be $Na_3Ga$ (corresponding to $Na_3GaH_6$ with 4.1 wt % hydrogen), or a mixed ternary alloy such as NaMgGa (corresponding to $NaMgGaH_6$ with 4.9 wt % hydrogen). For these HSMs, the lower hydrogen content may be compensated by superior hydrogenation and dehydrogenation characteristics.

Materials of the type $M_3GaH_6$ may be prepared using the following two methods. The first of these involves direct synthesis under a hydrogen atmosphere, as is the case for the aluminum analogue $Na_3AlH_6$ as set out in Eq. 1.

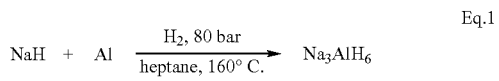

Eq.1

This method is applicable to both ternary products such as $Li_3GaH_6$ and quaternary ones such as $NaMgH_6$, as described above.

Alternatively, a two-step method may be used. In the first step a crown ether complex of $[GaH_6]^{3-}$ is prepared; this cation is then exchanged for a naked alkali metal counter-ion in the second step, as exemplified in Eqs 2-5, using a large anion to sequester the complex crown ether cation.

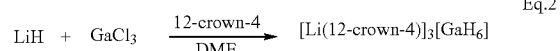

Eq.2

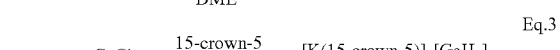

Eq.3

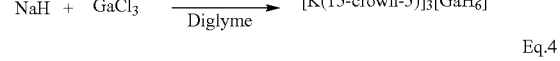

Eq.4

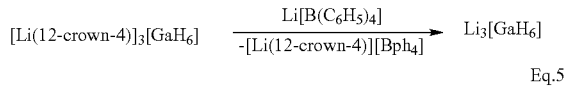

Eq.5

It will be apparent to those skilled in the art that materials, such as the tetrahydride $LiGaH_4$, having too fast a decomposition at ambient temperatures[1] are too unstable for use as HSMs according to the invention.

What is claimed is:

1. A reversible hydrogen storage material comprising a metal alloy that is a solid in its charged state and a liquid in its discharged state, wherein the hydrogen storage material is $NaMgGaH_6$.

2. A hydrogen storage material according to claim 1, wherein the hydrogen storage material in its discharged state is a liquid at room temperature.

3. A method of making a hydrogen storage material comprising a metal alloy that in its discharged state is in a liquid phase, comprising the step of hydrogenating a ternary alloy, wherein the ternary alloy is NaMgGa and the material is $NaMgGaH_6$.

4. A method of making a hydrogen storage material according to claim 3 wherein the material in its charged state is in a solid phase.

* * * * *